United States Patent
Cabrera et al.

(10) Patent No.: US 10,121,007 B2
(45) Date of Patent: Nov. 6, 2018

(54) METHOD AND SYSTEM FOR PROVIDING A ROBUST AND EFFICIENT VIRTUAL ASSET VULNERABILITY MANAGEMENT AND VERIFICATION SERVICE

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 597 days.

(21) Appl. No.: 14/186,801

(22) Filed: Feb. 21, 2014

(65) Prior Publication Data

US 2015/0242631 A1    Aug. 27, 2015

(51) Int. Cl.
*G06F 21/57* (2013.01)

(52) U.S. Cl.
CPC .................. *G06F 21/577* (2013.01)

(58) Field of Classification Search
CPC ..................................... G06F 21/577
See application file for complete search history.

(56) References Cited

U.S. PATENT DOCUMENTS

| | | | |
|---|---|---|---|
| 6,178,452 B1 | 1/2001 | Miyamoto | |
| 6,202,066 B1 | 3/2001 | Barkley et al. | |
| 6,321,338 B1 | 11/2001 | Porras et al. | |
| 7,055,062 B2 | 5/2006 | Shah et al. | |
| 7,228,438 B2 | 6/2007 | Bushmitch et al. | |
| 7,437,764 B1 * | 10/2008 | Sobel | G06F 21/562 |
| | | | 713/176 |
| 7,574,746 B2 | 8/2009 | Hill et al. | |

(Continued)

FOREIGN PATENT DOCUMENTS

| | | |
|---|---|---|
| CN | 101374051 | 2/2009 |
| WO | WO 2009/079648 | 6/2009 |

(Continued)

OTHER PUBLICATIONS

Schwarzkopf et al., "Increasing virtual machine security in cloud environments" Jul. 2012, pp. 1-12 http://www.journalofcloudcomputing.com/content/pdf/2192-113X-1-12.pdf.*

(Continued)

*Primary Examiner* — Jung W Kim
*Assistant Examiner* — Carlos M De Jesus Lassala
(74) *Attorney, Agent, or Firm* — Hawley Troxell Ennis & Hawley LLP; Philip McKay

(57) ABSTRACT

A virtual asset testing environment is provided that is distinct from a production computing environment. A virtual asset creation template associated with a class of virtual assets to be verified is identified, each virtual asset of the class of virtual assets being created using the virtual asset creation template. A designated test virtual asset is generated using the virtual asset creation template that is deployed in the virtual asset testing environment. The designated test virtual asset is then analyzed in the virtual asset testing environment to identify any vulnerabilities in the designated test virtual asset. If a vulnerability is identified in the designated test virtual asset, a remedy to the vulnerability is applied to the virtual asset creation template, and/or virtual assets created by the virtual asset creation template deployed in the production environment.

12 Claims, 3 Drawing Sheets

(56) References Cited

U.S. PATENT DOCUMENTS

| | | | |
|---|---|---|---|
| 7,577,722 | B1 | 8/2009 | Khandekar et al. |
| 7,600,153 | B2 | 10/2009 | Cabrera et al. |
| 7,640,458 | B2 | 12/2009 | Rao et al. |
| 7,779,247 | B2 | 8/2010 | Roegner |
| 7,792,256 | B1 | 9/2010 | Arledge et al. |
| 7,925,923 | B1 | 4/2011 | Hyser et al. |
| 8,108,855 | B2 | 1/2012 | Dias et al. |
| 8,132,231 | B2 | 3/2012 | Amies et al. |
| 8,161,475 | B2 | 4/2012 | Araujo, Jr. et al. |
| 8,181,036 | B1 | 5/2012 | Nachenberg |
| 8,191,149 | B2 | 5/2012 | Yun et al. |
| 8,327,373 | B2 | 12/2012 | Srinivasan |
| 8,341,625 | B2 | 12/2012 | Ferris et al. |
| 8,347,281 | B2 | 1/2013 | Arsenault et al. |
| 8,639,923 | B2 | 1/2014 | Lo et al. |
| 8,656,482 | B1 | 2/2014 | Tosa et al. |
| 8,688,820 | B1 | 4/2014 | Bhogi et al. |
| 8,799,431 | B2 | 8/2014 | Pabari |
| 8,863,284 | B1 | 10/2014 | Polyakov et al. |
| 8,918,785 | B1 | 12/2014 | Brandwine et al. |
| 8,959,633 | B1 | 2/2015 | Dokey et al. |
| 9,215,153 | B2 | 12/2015 | DeLuca et al. |
| 2004/0010571 | A1 | 1/2004 | Hutchinson et al. |
| 2005/0108571 | A1 | 5/2005 | Lu et al. |
| 2005/0155013 | A1 | 7/2005 | Carrigan |
| 2005/0183138 | A1 | 8/2005 | Phillips et al. |
| 2005/0193231 | A1 | 9/2005 | Scheuren |
| 2006/0064740 | A1 | 3/2006 | Kelley et al. |
| 2006/0101519 | A1 | 5/2006 | Lasswell et al. |
| 2006/0136720 | A1 | 6/2006 | Armstrong et al. |
| 2006/0248573 | A1 | 11/2006 | Pannu et al. |
| 2006/0272018 | A1 | 11/2006 | Fouant |
| 2007/0043860 | A1 | 2/2007 | Pabari |
| 2007/0101400 | A1 | 5/2007 | Freeman et al. |
| 2007/0169204 | A1 | 7/2007 | Janakiraman et al. |
| 2007/0204346 | A1 | 8/2007 | Meier |
| 2007/0250424 | A1 | 10/2007 | Kothari |
| 2008/0244744 | A1 | 10/2008 | Thomas et al. |
| 2008/0256639 | A1 | 10/2008 | Onoda et al. |
| 2009/0089860 | A1 | 4/2009 | Forrester et al. |
| 2009/0172788 | A1 | 7/2009 | Vedula et al. |
| 2009/0177717 | A1 | 7/2009 | Meehan et al. |
| 2009/0228973 | A1 | 9/2009 | Kumar et al. |
| 2009/0293056 | A1 | 11/2009 | Ferris et al. |
| 2009/0328209 | A1 | 12/2009 | Nachenberg |
| 2010/0030878 | A1 | 2/2010 | Grabowski et al. |
| 2010/0057660 | A1 | 3/2010 | Kato |
| 2010/0070964 | A1 | 3/2010 | Blumfield et al. |
| 2010/0076987 | A1 | 3/2010 | Schreiner |
| 2010/0235828 | A1 | 9/2010 | Nishimura et al. |
| 2010/0251363 | A1 | 9/2010 | Todorovic |
| 2010/0306772 | A1 | 12/2010 | Arnold et al. |
| 2011/0040825 | A1 | 2/2011 | Ramzan et al. |
| 2011/0067097 | A1 | 3/2011 | Park et al. |
| 2011/0107398 | A1 | 5/2011 | Earl et al. |
| 2011/0167494 | A1 | 7/2011 | Bowen et al. |
| 2011/0197065 | A1 | 8/2011 | Stauth et al. |
| 2011/0258692 | A1 | 10/2011 | Morrison et al. |
| 2011/0302415 | A1 | 12/2011 | Ahmad et al. |
| 2012/0011510 | A1 | 1/2012 | Yamakabe |
| 2012/0030767 | A1 | 2/2012 | Rippert et al. |
| 2012/0060207 | A1 | 3/2012 | Mardikar et al. |
| 2012/0151553 | A1 | 6/2012 | Burgess et al. |
| 2012/0167167 | A1 | 6/2012 | Kruger et al. |
| 2012/0210425 | A1 | 8/2012 | Porras et al. |
| 2012/0240193 | A1 | 9/2012 | Littlefield et al. |
| 2012/0266167 | A1 | 10/2012 | Spiers et al. |
| 2012/0291094 | A9 | 11/2012 | Forrester et al. |
| 2012/0304300 | A1 | 11/2012 | LaBumbard |
| 2012/0317644 | A1 | 12/2012 | Kumar et al. |
| 2012/0324446 | A1 | 12/2012 | Fries et al. |
| 2013/0091376 | A1 | 4/2013 | Raspudic et al. |
| 2013/0097701 | A1 | 4/2013 | Moyle et al. |
| 2013/0117567 | A1 | 5/2013 | Chang et al. |
| 2013/0117809 | A1 | 5/2013 | McDougal et al. |
| 2013/0124712 | A1 | 5/2013 | Parker |
| 2013/0132950 | A1 | 5/2013 | McLeod et al. |
| 2013/0247133 | A1 | 9/2013 | Price et al. |
| 2013/0247207 | A1 | 9/2013 | Hugard et al. |
| 2013/0263226 | A1 | 10/2013 | Sudia |
| 2013/0290694 | A1 | 10/2013 | Civilini et al. |
| 2013/0304693 | A1* | 11/2013 | Jaeger ............... G06F 17/30563 707/602 |
| 2013/0318599 | A1 | 11/2013 | Fadida et al. |
| 2013/0326580 | A1 | 12/2013 | Barclay et al. |
| 2014/0033200 | A1 | 1/2014 | Tompkins |
| 2014/0040299 | A1 | 2/2014 | Datla et al. |
| 2014/0047546 | A1 | 2/2014 | Sidagni |
| 2014/0082733 | A1 | 3/2014 | Benefield |
| 2014/0096134 | A1 | 4/2014 | Barak et al. |
| 2014/0109192 | A1 | 4/2014 | Pidault et al. |
| 2014/0137257 | A1 | 5/2014 | Martinez et al. |
| 2014/0165130 | A1 | 6/2014 | Zaitsev |
| 2014/0189090 | A1 | 7/2014 | Mikkilineni |
| 2014/0196104 | A1 | 7/2014 | Chari et al. |
| 2014/0201836 | A1 | 7/2014 | Amsler |
| 2014/0223554 | A1 | 8/2014 | Roden, III |
| 2014/0282889 | A1 | 9/2014 | Ishaya et al. |
| 2014/0359259 | A1 | 12/2014 | Ali et al. |
| 2015/0052520 | A1 | 2/2015 | Crowell et al. |
| 2015/0106939 | A1 | 4/2015 | Lietz et al. |
| 2015/0120928 | A1 | 4/2015 | Gummaraju et al. |

FOREIGN PATENT DOCUMENTS

| | | |
|---|---|---|
| WO | WO 2012/023657 | 2/2012 |
| WO | WO 2013/123548 | 8/2013 |

OTHER PUBLICATIONS

Gryb et al., "Method and System for Validating a Virtual Asset," U.S. Appl. No. 14/070,050, filed Nov. 1, 2013.

Weaver et al., "Method and System for Providing and Dynamically Deploying Hardened Task Specific Virtual Hosts," U.S. Appl. No. 14/070,124, filed Nov. 1, 2013.

Cabrera et al., "Method and System for Dynamically and Automatically Managing Resource Access Permissions," U.S. Appl. No. 14/078,715, filed Nov. 13, 2013.

Lietz et al., "Method and System for Providing an Efficient Vulnerability Management and Verification Service," U.S. Appl. No. 14/192,529, filed Feb. 27, 2014.

Lietz et al., "Method and System for Providing Temporary Secure Access Enabled Virtual Assets," U.S. Appl. No. 14/217,653, filed Mar. 18, 2014.

Lietz et al., "Method and System for Providing Self-Monitoring, Self-Reporting, and Self-Repairing Virtual Assets in a Cloud Computing Environment," U.S. Appl. No. 14/256,289, filed Apr. 18, 2014.

Cabrera et al., "Method and System for Providing Automated Self-Healing Virtual Assets," U.S. Appl. No. 14/448,326, filed Jul. 31, 2014.

Lietz et al., "Method and System for Correlating Self-Reporting Virtual Asset Data with External Events to Generate an External Event Identification Database," U.S. Appl. No. 14/448,405, filed Jul. 31, 2014.

"VMware Backdoor I/O Port," [online], [retrieved Sep. 2, 2015]. Retrieved from the internet. <URL: http://sites.google.com/site/chitchatvmback/backdoor>.

"What is the Virtual Machine Backdoor," [online], [retrieved Sep. 2, 2015]. Retrieved from the internet. <URL: http://communities.vmware.com/thread/228415?start=0&start=0>.

Tupakula, et al., "Intrusion Detection Techniques for Infrastructure as a Service Cloud," 2011 IEEE Ninth International Conference on Dependable, Autonomic and Secure Computing, Dec. 12-14, 2011, IEEE.

* cited by examiner

METHOD AND SYSTEM FOR PROVIDING A ROBUST AND EFFICIENT VIRTUAL ASSET VULNERABILITY MANAGEMENT AND VERIFICATION SERVICE

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because any vulnerability in any of the often numerous virtual assets provided and/or utilized in a cloud-based infrastructure, such as operating systems, virtual machines and virtual server instances, connectivity, etc., represents a potential threat. Consequently, the number, and variety, of potential vulnerabilities can be overwhelming and many currently available vulnerability management approaches lack the ability to track and control these potentially numerous vulnerabilities in any reasonably comprehensive, or even logical, manner.

As noted above, the situation is particularly problematic in cases where sensitive data, such as financial data, is being provided to, processed by, utilized by, and/or distributed by, the various virtual assets, systems, services, and applications within the cloud. This is because exploitation of vulnerabilities in a given virtual asset, system, service, or application can yield devastating results to the owners, even if the breach is an isolated occurrence and is of limited duration. That is to say, with many types of data, developing or deploying a remedy for a vulnerability after that vulnerability has been exploited is no solution at all because irreparable damage may have already been done.

Consequently, the current approaches to vulnerability management that typically involve addressing vulnerabilities on an ad-hoc basis as they arise, or in a simplistic, uncoordinated, static, and largely manual, manner are no longer acceptable. Indeed, in order for applications and systems that process sensitive data to fully migrate to a cloud-based infrastructure, security issues and vulnerabilities must be addressed in a proactive, anticipatory, and comprehensive manner, where the security and invulnerability to attack of virtual assets is verified well before any potential attack can possibly occur, e.g. before deployment and publishing in a production environment.

However, currently, this type of comprehensive approach to vulnerability management and verification is largely unavailable. In addition, in the few cases where a comprehensive approach to vulnerability management and verification is attempted, the vulnerabilities are typically analyzed after deployment of the virtual assets and then each virtual asset is individually verified in the production environment. Consequently, currently, vulnerability management and verification is prohibitively expensive and resource intensive, often requiring significant amounts of dedicated hardware, software, and human administrators that are still often utilized in an ad-hoc manner.

In addition, currently, virtual asset vulnerability analysis and verification management is typically done after the virtual assets are deployed in the computing environment in which they are intended to be used, i.e., in the production computing environment. However, when the virtual assets are deployed in a production computing environment it is often the case that one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or in any other connectivity controlled environment created by the imposition of one or more connectivity restrictions, as discussed herein, and/or as known in the art at the time of filing, and/or as developed after the time of filing.

Given that one or more connectivity restrictions are imposed on the virtual assets in the production computing environment, when a virtual asset is subjected to vulnerability analysis and verified in the production computing environment, there is no way for the verification system to check for vulnerabilities that may be present in a situation where one or more of the connectivity restrictions have been removed. In short, if a given virtual asset is restricted to a specific type of connectivity in a production computing environment, then any vulnerability analysis and verification process can only be performed on the specific type of connectivity provided to the virtual asset in the production computing environment. As a result, no vulnerability testing or verification can be performed on the virtual asset in the production computing environment that is associated with a different, or new, type of connectivity, or operational scenario, other than the specific type of connectivity allowed for the virtual asset in the production computing environment.

In light of the situation described above, currently, the vulnerability analysis and verification process, at best, is incomplete and only provides reasonably accurate data if the virtual assets are deployed in the production computing environment exactly as intended and no changes are made to the type of connectivity, and operational parameters, expected to be provided to the virtual assets. Consequently, serious vulnerabilities may still be present in the virtual assets that will only be revealed if there is a change in the type of connectivity and/or operational scenario associated with the virtual asset. However, if there is a change in the type of connectivity and/or operational scenario associated with the virtual asset, an unexpected vulnerability may well result and, as noted above, if this vulnerability is exploited the damage done may well be irreparable and devastating.

What is needed is a method and system for providing vulnerability analysis and verification management that extends beyond the expected connectivity restrictions and production computing environment associated with a given virtual asset and allows the virtual asset to be verified to be free of vulnerabilities in a broad range of connectivity and operational environments beyond that expected and that can be tested for in the production computing environment.

SUMMARY

In accordance with one embodiment, a method and system for providing a robust and efficient virtual asset vulnerability management and verification service includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy associated with the vulnerability identified in the designated test virtual asset is applied to the virtual asset creation template to transform the virtual asset creation template to a verified virtual asset creation template. In one embodiment, the verified virtual asset creation template is then used to create virtual assets of the virtual asset class to be deployed in the production environment.

In accordance with one embodiment, a method and system for providing a robust and efficient virtual asset vulnerability management and verification service includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy to the vulnerability identified in the designated test virtual asset is applied to the virtual assets of the virtual asset class deployed in the production environment.

Figure 1:
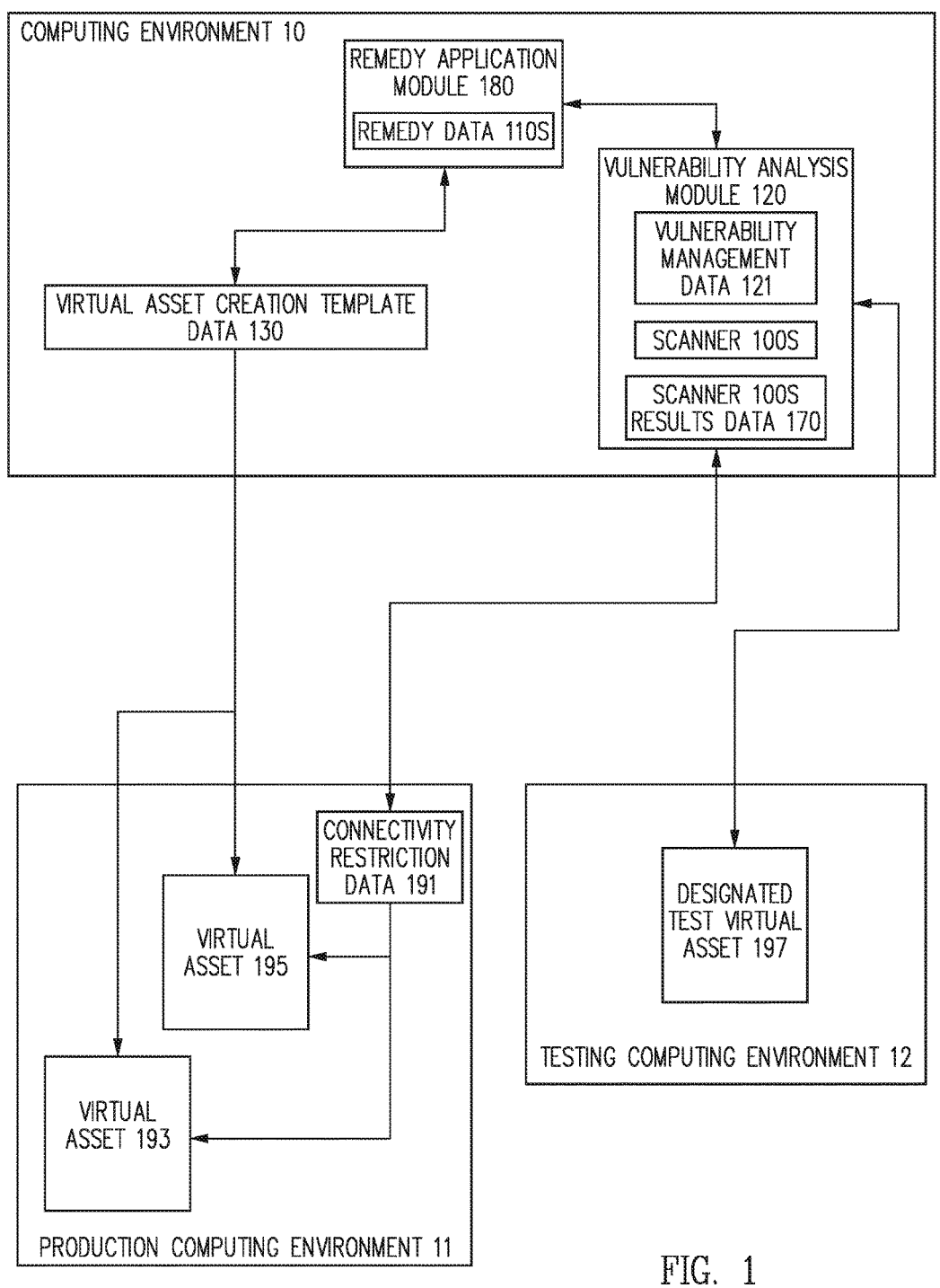
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, methods and systems for providing a robust and efficient virtual asset vulnerability management and verification service include processes for providing a robust and efficient virtual asset vulnerability management and verification service implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the processes for providing a robust and efficient virtual asset vulnerability management and verification service are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the methods and systems for providing a robust and efficient virtual asset vulnerability management and verification service discussed herein. Of particular note, the various elements in FIG. 1 are shown for illustrative purposes as being associated with specific computing environments, such as computing environment 10, production computing environment 11, and testing computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

In accordance with one embodiment, a method and system for providing a robust and efficient virtual asset vulnerability management and verification service includes a process for providing a robust and efficient virtual asset vulnerability management and verification service whereby, in one embodiment, a cloud-based production computing environment is provided in which one or more virtual assets are to be deployed.

In various embodiments, the provided production computing environment can be any form of cloud computing environment, such as, but not limited to, a public cloud; a private cloud; a virtual private network (VPN); a Virtual Private Cloud, or VPC; a sub-net; or any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, such as multiple VPCs, in the course of providing the associated service. In various embodiments, each cloud computing environment includes allocated virtual assets associated with, and controlled or used by, the party utilizing the cloud computing environment.

As noted above, in order to ensure security policies are met, when the virtual assets are deployed in the provided production computing environment, one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or under any other connectivity controlled environment created by the imposition of one or more connectivity restrictions, as discussed herein, and/or as known in the art at the time of filing, and/or as developed after the time of filing.

As also noted above, given that one or more connectivity restrictions are imposed on the virtual assets in the production computing environment, when a virtual asset is subjected to vulnerability analysis and verified in the production computing environment, there is no way for the verification system to check for vulnerabilities that may be present in a situation where one or more of the connectivity restrictions have been removed. In short, if a given virtual asset is restricted to a specific type of connectivity in a production computing environment, then any vulnerability analysis and verification process can only be performed on the specific type of connectivity provided to the virtual asset in the production computing environment. As a result, no vulnerability testing or verification can be performed on the virtual asset in the production computing environment that is associated with a different, or new, type of connectivity, or operational scenario, other than the specific type of connectivity allowed for the virtual asset in the production computing environment.

To address this issue, in one embodiment, a virtual asset testing computing environment is provided. In various embodiments, the provided virtual asset testing computing environment can be any form of computing environment that is distinct and physically or logically different from the provided production computing environment. In various embodiments, the testing computing environment can itself be an isolated portion of a public cloud; a private cloud; a virtual private network (VPN); a Virtual Private Cloud, or VPC; a sub-net; or any security/communications grouping; or any other infrastructure, sub-structure, or architecture, as discussed herein, and/or as known in the art at the time of filing, and/or as developed after the time of filing.

As discussed in more detail below, in one embodiment, one way the testing computing environment is distinct from the production computing environment is that at least one, and, in some embodiments, multiple or all, of the one or more connectivity restrictions imposed on the virtual assets in the production computing environment are not imposed in the testing computing environment. Consequently, as discussed below, when a designated test virtual asset is subjected to vulnerability analysis and verified in the testing computing environment, the verification system is able check for vulnerabilities that may be present in a situation where one or more of the connectivity restrictions have been removed, or changed.

In one embodiment, a class of virtual assets to be vulnerability analyzed and verified is designated.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases implemented, or associated with, a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, the virtual asset creation template associated with, and used to create, a class of virtual assets to be verified is identified.

In one embodiment, once the virtual asset creation template associated with, and used to create, a class of virtual assets to be verified is identified, the virtual asset creation template is used to create a given example, or instance, of the virtual asset class and this instance of the virtual asset class is designated a test virtual asset.

In one embodiment, the designated test virtual asset is then deployed, e.g., instantiated, in the testing computing environment. In one embodiment, the designated test virtual asset is then subjected to vulnerability analysis and verification in the testing computing environment.

Herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

FIG. 1 is a functional diagram of the interaction of various elements associated with one embodiment of the method and system for providing a robust and efficient virtual asset vulnerability management and verification service discussed herein. As seen in FIG. 1, computing environment 10 is shown where, in this specific illustrative example, virtual asset creation template data 130 is shown representing a given virtual asset creation template.

As discussed in more detail below, also seen in FIG. 1 is vulnerability management policy and/or vulnerability characteristic data, represented FIG. 1 as vulnerability management data 121 of vulnerability analysis module 120. Also seen in FIG. 1 is remedy application module 180 including remedy data 110S for closing a vulnerability scanned for by scanner 100S of vulnerability analysis module 120.

Also shown in FIG. 1 is production computing environment 11 including connectivity restrictions, represented in FIG. 1 by connectivity restriction data 191. Virtual assets 193 and 195, created using virtual asset creation template data 130, are also shown as deployed, e.g., instantiated, in production computing environment 11.

Also shown in FIG. 1 is testing computing environment 12 with designated test virtual asset 197 having been created by virtual asset creation template data 130 and deployed, e.g., instantiated, in testing computing environment 12.

As discussed above, in one embodiment, one way testing computing environment 12 is distinct from the production computing environment 11 is that at least one, and, in some embodiments, multiple or all, of the one or more connectivity restrictions, represented by connectivity restriction data 191, imposed on virtual assets 193 and 195 in production computing environment 11 are not imposed on designated test virtual asset 197 in testing computing environment 12.

Consequently, when designated test virtual asset 197 is subjected to vulnerability analysis and verified in testing computing environment 12, the verification system, e.g., vulnerability analysis module 120, is able check for vulnerabilities that may be present in designated test virtual asset 197 in a situation where one or more of the connectivity restrictions have been removed. However, since designated test virtual asset 197 is created using the same virtual asset creation template, represented by virtual asset creation template data 130, used to create all virtual assets of the same virtual asset class, e.g., virtual assets 193 and 195, by testing designated test virtual asset 197 for vulnerabilities that may be present in a situation where one or more of the connectivity restrictions are removed, each virtual asset of the virtual asset class, e.g., virtual assets 193 and 195, is essentially also tested and verified under the same conditions.

As a result, using the method and system for providing a robust and efficient virtual asset vulnerability management and verification service discussed herein, the vulnerability analysis and verification process is more complete and provides accurate data for not only situations where the virtual assets are deployed in the production computing environment exactly as intended and no changes are made to the type of connectivity, and operational parameters, but also where one or more changes to connectivity and operational parameters occur in the production computing environment. As a result, many serious vulnerabilities that could still be present in the virtual assets after conducting vulnerability analysis in the production environment can be revealed, thereby decreasing the chance of an unexpected vulnerability.

In short, in the testing computing environment, the designated test virtual asset, and therefore each virtual asset of the same class, can be subjected to any vulnerability analysis and verification process applied to any type of connectivity provided to the virtual asset in the testing computing environment. As a result, vulnerability testing or verification can be performed on the designated test virtual asset in the test computing environment associated with a type of connectivity, or operational scenario, other than the specific type of connectivity allowed for the virtual asset in the production computing environment.

In one embodiment, scans are used to identify any vulnerabilities in the designated test virtual asset. In one embodiment, the scans are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of the process for providing a robust and efficient virtual asset vulnerability management and verification service, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with the process for providing a robust and efficient virtual asset vulnerability management and verification service, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, the designated test virtual asset is analyzed to identify any vulnerabilities in the designated test virtual asset, and therefore in any virtual assets of the virtual asset class, using selected scanners capable of detecting and monitoring the vulnerabilities and vulnerability characteristics associated the vulnerability management data.

Referring back to FIG. 1, scanner data including scanner 100S is shown in vulnerability analysis module 120.

In one embodiment, scanner 100S is applied to designated test virtual asset 197 in testing computing environment 12 and, in one embodiment, to virtual assets 193 and 195 in production computing environment 11.

In one embodiment, if no vulnerabilities are identified in the designated test virtual asset in the testing computing environment, the virtual asset creation template is verified and each virtual asset of the virtual asset class generated using the virtual asset creation template, including the virtual assets deployed in the production environment, is assumed to be free of the vulnerabilities tested for in the designated test virtual asset in the testing computing environment.

FIG. 1 shows scanner 100S results data 170 in vulnerability analysis module 120 indicating the results of the application of scanner 100S to designated test virtual asset 197. In one embodiment, if scanner 100S results data 170 identifies no vulnerabilities in designated test virtual asset 197, i.e., designated test virtual asset 197 is verified, the initial status of virtual assets 193 and 195, created using virtual asset creation template data 130, is set to, or transformed to, that of verified virtual asset status.

In one embodiment, if one or more vulnerabilities are identified in the designated test virtual asset, an appropriate remedy for each identified vulnerability identified in the designated test virtual asset is identified and applied at the virtual asset creation template level, e.g., the remedy is applied to the virtual asset creation template used to create both the designated test virtual asset deployed in the testing computing environment and the virtual assets deployed in the production computing environment.

In one embodiment, if one or more vulnerabilities are identified in the designated test virtual asset, an appropriate remedy for each identified vulnerability identified in the designated test virtual asset is identified and applied to each of the virtual assets deployed in the production computing environment.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on a virtual asset creation template, and/or the virtual assets being vulnerability managed, once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database (not shown).

Referring to FIG. 1, remedy data 110S representing the remedy and/or procedure associated with the vulnerabilities and vulnerability characteristics scanned for by scanner 100S is shown in remedy application module 180.

In one embodiment, each vulnerability identified in the designated test virtual asset is remedied by applying the identified appropriate remedy to the virtual asset creation template and/or the virtual assets.

Referring to FIG. 1, if scanner 100S results data 170 indicates the vulnerability scanned for by scanner 100S is identified in designated test virtual asset 197, then the corresponding remedy represented by remedy data 110S is obtained and applied to virtual asset creation template data 130, and/or virtual assets 193 and 195, by remedy application module 180.

In one embodiment, once each vulnerability identified in the designated test virtual asset is remedied, each virtual asset of the virtual asset class generated using the virtual asset creation template is assumed to be free of the vulnerabilities tested for in designated test virtual asset 197 and is assigned an initial status of verified virtual asset.

Using the methods and systems for providing a robust and efficient virtual asset vulnerability management and verification service discussed herein, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using the methods and systems for providing a robust and efficient virtual asset vulnerability management and verification service discussed herein, vulnerability testing or verification can be performed on the designated test virtual asset in the test computing environment associated with a type of connectivity, or operational scenario, other than the specific type of connectivity allowed for the virtual asset in the production computing environment.

Process

In accordance with one embodiment, a process for providing a robust and efficient virtual asset vulnerability management and verification service includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy associated with the vulnerability identified in the designated test virtual asset is applied to the virtual asset creation template to transform the virtual asset creation template to a verified virtual asset creation template. In one embodiment, the verified virtual asset creation template is then used to create virtual assets of the virtual asset class to be deployed in the production environment.

Figure 2:
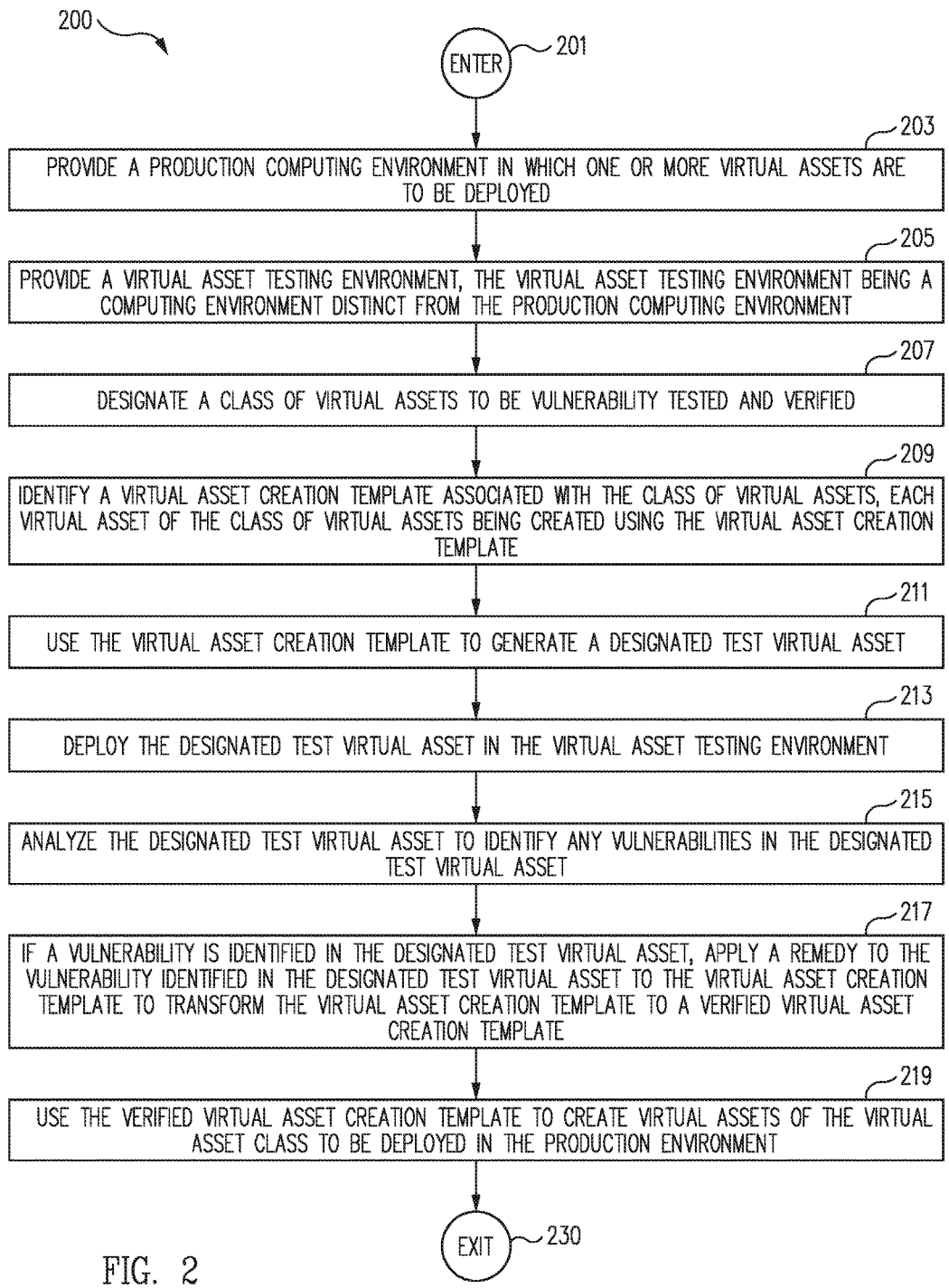
FIG. 2 is a flow chart depicting a process for providing a robust and efficient virtual asset vulnerability management and verification service in accordance with one embodiment.

FIG. 2 is a flow chart of a process 200 for providing a robust and efficient virtual asset vulnerability management and verification service.

In one embodiment, process 200 begins at ENTER OPERATION 201 of FIG. 2 and process flow proceeds to PROVIDE A PRODUCTION COMPUTING ENVIRON-

MENT IN WHICH ONE OR MORE VIRTUAL ASSETS ARE TO BE DEPLOYED OPERATION 203.

In one embodiment at PROVIDE A PRODUCTION COMPUTING ENVIRONMENT IN WHICH ONE OR MORE VIRTUAL ASSETS ARE TO BE DEPLOYED OPERATION 203 a cloud-based production computing environment is provided in which one or more virtual assets are to be deployed.

In various embodiments, the production computing environment provided at PROVIDE A PRODUCTION COMPUTING ENVIRONMENT IN WHICH ONE OR MORE VIRTUAL ASSETS ARE TO BE DEPLOYED OPERATION 203 can be any form of cloud computing environment, such as, but not limited to, a public cloud; a private cloud; a virtual private network (VPN); a Virtual Private Cloud, or VPC; a sub-net; or any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, such as multiple VPCs, in the course of providing the associated service. In various embodiments, each cloud computing environment includes allocated virtual assets associated with, and controlled or used by, the party utilizing the cloud computing environment.

As noted above, in order to ensure security policies are met, when the virtual assets are deployed in the production computing environment provided at PROVIDE A PRODUCTION COMPUTING ENVIRONMENT IN WHICH ONE OR MORE VIRTUAL ASSETS ARE TO BE DEPLOYED OPERATION 203 one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or under any other connectivity controlled environment created by the imposition of one or more connectivity restrictions, as discussed herein, and/or as known in the art at the time of filing, and/or as developed after the time of filing.

As also noted above, given that one or more connectivity restrictions are imposed on the virtual assets in the production computing environment of PROVIDE A PRODUCTION COMPUTING ENVIRONMENT IN WHICH ONE OR MORE VIRTUAL ASSETS ARE TO BE DEPLOYED OPERATION 203, when a virtual asset is subjected to vulnerability analysis and verified in the production computing environment of PROVIDE A PRODUCTION COMPUTING ENVIRONMENT IN WHICH ONE OR MORE VIRTUAL ASSETS ARE TO BE DEPLOYED OPERATION 203, there is no way for the verification system to check for vulnerabilities that may be present in a situation where one or more of the connectivity restrictions have been removed.

In short, if a given virtual asset is restricted to a specific type of connectivity in the production computing environment of PROVIDE A PRODUCTION COMPUTING ENVIRONMENT IN WHICH ONE OR MORE VIRTUAL ASSETS ARE TO BE DEPLOYED OPERATION 203, then any vulnerability analysis and verification process can only be performed on the specific type of connectivity provided to the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203. As a result, no vulnerability testing or verification can be performed on the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203 that is associated with a different, or new, type of connectivity, or operational scenario, other than the specific type of connectivity allowed for the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203.

To address this issue, in one embodiment, a virtual asset testing computing environment is provided at PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

In various embodiments, the provided virtual asset testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 can be any form of computing environment that is distinct and physically or logically different from the provided production computing environment of PROVIDE A PRODUCTION COMPUTING ENVIRONMENT IN WHICH ONE OR MORE VIRTUAL ASSETS ARE TO BE DEPLOYED OPERATION 203.

In various embodiments, the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 can itself be an isolated portion of a public cloud; a private cloud; a virtual private network (VPN); a Virtual Private Cloud, or VPC; a sub-net; or any security/communications grouping; or any other infrastructure, sub-structure, or architecture, as discussed herein, and/or as known in the art at the time of filing, and/or as developed after the time of filing.

As discussed in more detail below, in one embodiment, one way the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 is distinct from the production computing environment of PROVIDE A PRODUCTION COMPUTING ENVIRONMENT IN WHICH ONE OR MORE VIRTUAL ASSETS ARE TO BE DEPLOYED OPERATION 203 is that at least one, and, in some embodiments, multiple or all, of the one or more connectivity restrictions imposed on the virtual assets in the production computing environment of PROVIDE A PRODUCTION COMPUTING ENVIRONMENT IN WHICH ONE OR MORE VIRTUAL ASSETS ARE TO BE DEPLOYED OPERATION 203 are not imposed in the testing computing environment PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205. Consequently, as discussed below, when a designated test virtual asset is subjected to vulnerability analysis and verified in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the verification system is able check for vulnerabilities that may be present in a situation where one or more of the connectivity restrictions have been removed or a new connectivity is provided.

In one embodiment, once a production computing environment is provided at PROVIDE A PRODUCTION COMPUTING ENVIRONMENT IN WHICH ONE OR MORE VIRTUAL ASSETS ARE TO BE DEPLOYED OPERATION 203 and a testing computing environment is provided at PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, process flow proceeds to DESIGNATE A CLASS OF VIRTUAL ASSETS TO BE VULNERABILITY TESTED AND VERIFIED OPERATION 207.

In one embodiment, at DESIGNATE A CLASS OF VIRTUAL ASSETS TO BE VULNERABILITY TESTED AND VERIFIED OPERATION 207 a class of virtual assets to be vulnerability analyzed and verified is designated.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases implemented, or associated with, a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, once a class of virtual assets to be vulnerability analyzed and verified is designated at DESIGNATE A CLASS OF VIRTUAL ASSETS TO BE VULNERABILITY TESTED AND VERIFIED OPERATION 207, process flow proceeds to IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209.

In one embodiment, at IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 the virtual asset creation template associated with, and used to create, the designated class of virtual assets to be verified of DESIGNATE A CLASS OF VIRTUAL ASSETS TO BE VULNERABILITY TESTED AND VERIFIED OPERATION 207 is identified.

In one embodiment, once a virtual asset creation template associated with the class of virtual assets of DESIGNATE A CLASS OF VIRTUAL ASSETS TO BE VULNERABILITY TESTED AND VERIFIED OPERATION 207 is identified at IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209, process flow proceeds to USE THE VIRTUAL ASSET

CREATION TEMPLATE TO GENERATE A DESIGNATED TEST VIRTUAL ASSET OPERATION 211.

In one embodiment, at USE THE VIRTUAL ASSET CREATION TEMPLATE TO GENERATE A DESIGNATED TEST VIRTUAL ASSET OPERATION 211 the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is used to create a given example, or instance, of the virtual asset class and this instance of the virtual asset class is designated a test virtual asset.

In one embodiment, once the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is used to create a designated a test virtual asset at USE THE VIRTUAL ASSET CREATION TEMPLATE TO GENERATE A DESIGNATED TEST VIRTUAL ASSET OPERATION 211, process flow proceeds to DEPLOY THE DESIGNATED TEST VIRTUAL ASSET IN THE VIRTUAL ASSET TESTING ENVIRONMENT OPERATION 213.

In one embodiment, at DEPLOY THE DESIGNATED TEST VIRTUAL ASSET IN THE VIRTUAL ASSET TESTING ENVIRONMENT OPERATION 213 the designated test virtual asset of USE THE VIRTUAL ASSET CREATION TEMPLATE TO GENERATE A DESIGNATED TEST VIRTUAL ASSET OPERATION 211 is deployed, e.g., instantiated, in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

In one embodiment, once the designated test virtual asset of USE THE VIRTUAL ASSET CREATION TEMPLATE TO GENERATE A DESIGNATED TEST VIRTUAL ASSET OPERATION 211 is deployed, e.g., instantiated, in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 at DEPLOY THE DESIGNATED TEST VIRTUAL ASSET IN THE VIRTUAL ASSET TESTING ENVIRONMENT OPERATION 213, process flow proceeds to ANALYZE THE DESIGNATED TEST VIRTUAL ASSET TO IDENTIFY ANY VULNERABILITIES IN THE DESIGNATED TEST VIRTUAL ASSET OPERATION 215.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 the designated test virtual asset of DEPLOY THE DESIGNATED TEST VIRTUAL ASSET IN THE VIRTUAL ASSET TESTING ENVIRONMENT OPERATION 213 is subjected to vulnerability analysis and verification in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

As noted above, herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

As discussed above, in one embodiment, one way the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 is distinct from the production computing environment of PROVIDE A PRODUCTION COMPUTING ENVIRONMENT IN WHICH ONE OR MORE VIRTUAL ASSETS ARE TO BE DEPLOYED OPERATION 203 is that at least one, and, in some embodiments, multiple or all, of the one or more connectivity restrictions imposed on the virtual assets in production computing environment of PROVIDE A PRODUCTION COMPUTING ENVIRONMENT IN WHICH ONE OR MORE VIRTUAL ASSETS ARE TO BE DEPLOYED OPERATION 203 are not imposed on the designated test virtual asset of DEPLOY THE DESIGNATED TEST VIRTUAL ASSET IN THE VIRTUAL ASSET TESTING ENVIRONMENT OPERATION 213 in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

Consequently, when the designated test virtual asset of DEPLOY THE DESIGNATED TEST VIRTUAL ASSET IN THE VIRTUAL ASSET TESTING ENVIRONMENT OPERATION 213 is subjected to vulnerability analysis and verification of ANALYZE THE DESIGNATED TEST VIRTUAL ASSET TO IDENTIFY ANY VULNERABILITIES IN THE DESIGNATED TEST VIRTUAL ASSET OPERATION 215 in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the verification system of ANALYZE THE DESIGNATED TEST VIRTUAL ASSET TO IDENTIFY ANY VULNERABILITIES IN THE DESIGNATED TEST VIRTUAL ASSET OPERATION 215 is able check for vulnerabilities that may be present in the designated test virtual asset in a situation where one or more of the connectivity restrictions have been removed.

However, since the designated test virtual asset of USE THE VIRTUAL ASSET CREATION TEMPLATE TO GENERATE A DESIGNATED TEST VIRTUAL ASSET OPERATION 211 is created using the same virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 used to create all virtual assets of the same virtual asset class, by testing designated test virtual asset for vulnerabilities that may be present in a situation where one or more of the connectivity restrictions are removed at ANALYZE THE DESIGNATED TEST VIRTUAL ASSET TO IDENTIFY ANY VULNERABILITIES IN THE DESIGNATED TEST VIRTUAL ASSET OPERATION 215, each virtual asset of the virtual asset class is essentially also tested and verified under the same conditions.

As a result, using process 200 for providing a robust and efficient virtual asset vulnerability management and verification service discussed herein, the vulnerability analysis and verification process is more complete and provides accurate data for both situations where the virtual assets are deployed in the production computing environment exactly as intended and no changes are made to the type of connectivity, and operational parameters, and where one or more changes to connectivity and operational parameters occur in the production computing environment. As a result, many serious vulnerabilities that could still be present in the virtual assets after conducting vulnerability analysis in the production environment can be revealed, thereby decreasing the chance of an unexpected vulnerability.

In short, in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the designated test virtual asset of DEPLOY THE DESIGNATED TEST VIRTUAL ASSET IN THE VIRTUAL ASSET TESTING ENVIRONMENT OPERATION 213, and therefore each virtual asset of the same class, can be subjected to any vulnerability analysis and verification process applied to any type of connectivity provided to the virtual asset in the testing computing environment. As a result, vulnerability testing or verification can be performed on the designated test virtual asset in the test computing environment associated with a type of connectivity, or operational scenario, other than the specific type of connectivity allowed for the virtual asset in the production computing environment.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 scans are used to identify any vulnerabilities in the designated test virtual asset. In one embodiment, the scans are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of the process for providing a robust and efficient virtual asset vulnerability management and verification service, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with process 200 for providing a robust and efficient virtual asset vulnerability management and verification service, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 the designated test virtual asset is analyzed to identify any vulnerabilities in the designated test virtual asset, and therefore in any virtual assets of the virtual asset class, using selected scanners capable of detecting and monitoring the vulnerabilities and vulnerability characteristics associated the vulnerability management data.

In one embodiment, once the designated test virtual asset of USE THE VIRTUAL ASSET CREATION TEMPLATE TO GENERATE A DESIGNATED TEST VIRTUAL ASSET OPERATION 211 is subjected to vulnerability analysis and verification in the testing computing environment at ANALYZE THE DESIGNATED TEST VIRTUAL ASSET TO IDENTIFY ANY VULNERABILITIES IN THE DESIGNATED TEST VIRTUAL ASSET OPERATION 215, if no vulnerabilities are identified in the designated test virtual asset in the testing computing environment, process flow proceeds to USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219 and the virtual asset creation template is verified and each virtual asset of the virtual asset class generated using the virtual asset creation template, including the virtual assets deployed in the production environment, is assumed to be free of the vulnerabilities tested for in the designated test virtual asset in the testing computing environment.

In one embodiment, if one or more vulnerabilities are identified in the designated test virtual asset, process flow proceeds to IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217.

In one embodiment, at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEM- PLATE TO A VERIFIED VIRTUAL ASSET CREATION TEMPLATE OPERATION 217 an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied at the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209, e.g., the remedy is applied to the virtual asset creation template used to create both the designated test virtual asset deployed in the testing computing environment and the virtual assets deployed in the production computing environment.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on a virtual asset creation template, and/or the virtual assets being vulnerability managed, once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

In one embodiment, each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is remedied by applying the identified appropriate remedy to the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied to the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217, the status of the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is transformed to a status of verified virtual asset creation template.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied to the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 and the status of the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is transformed to a status of verified virtual asset creation template at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217, process flow proceeds to USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219.

In one embodiment, at USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219 the verified virtual asset creation template of IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217 is used to create all virtual assets of the designated test virtual asset class to be verified of DESIGNATE A CLASS OF VIRTUAL ASSETS TO BE VULNERABILITY TESTED AND VERIFIED OPERATION 207.

In one embodiment, once the verified virtual asset creation template of IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217 is used to create all virtual assets of the designated test virtual asset class to be verified of DESIGNATE A CLASS OF VIRTUAL ASSETS TO BE VULNERABILITY TESTED AND VERIFIED OPERATION 207 at USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219, process flow proceeds to EXIT OPERATION 230.

In one embodiment, at EXIT OPERATION 230 process 200 for providing a robust and efficient virtual asset vulnerability management and verification service is exited to await new data.

Using process 200 for providing a robust and efficient virtual asset vulnerability management and verification service, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using process 200 for providing a robust and efficient virtual asset vulnerability management and verification service, vulnerability testing or verification can be performed on the designated test virtual asset in the test computing environment associated with a type of connectivity, or operational scenario, other than the specific type of connectivity allowed for the virtual asset in the production computing environment.

In addition, remedies are applied at the virtual asset creation template level so that a remedy can be performed for all virtual assets created using a given virtual asset creation template. Consequently, using process 200 for providing a robust and efficient virtual asset vulnerability management and verification service, minimal resources are required to ensure each virtual asset of a given virtual asset class is free of defined vulnerabilities and/or conforms to various, and dynamically defined, security policies.

In accordance with one embodiment, a method and system for providing a robust and efficient virtual asset vulnerability management and verification service includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

If a vulnerability is identified in the designated test virtual asset, a remedy to the vulnerability identified in the designated test virtual asset is applied to the virtual assets of the virtual asset class deployed in the production environment.

Figure 3:
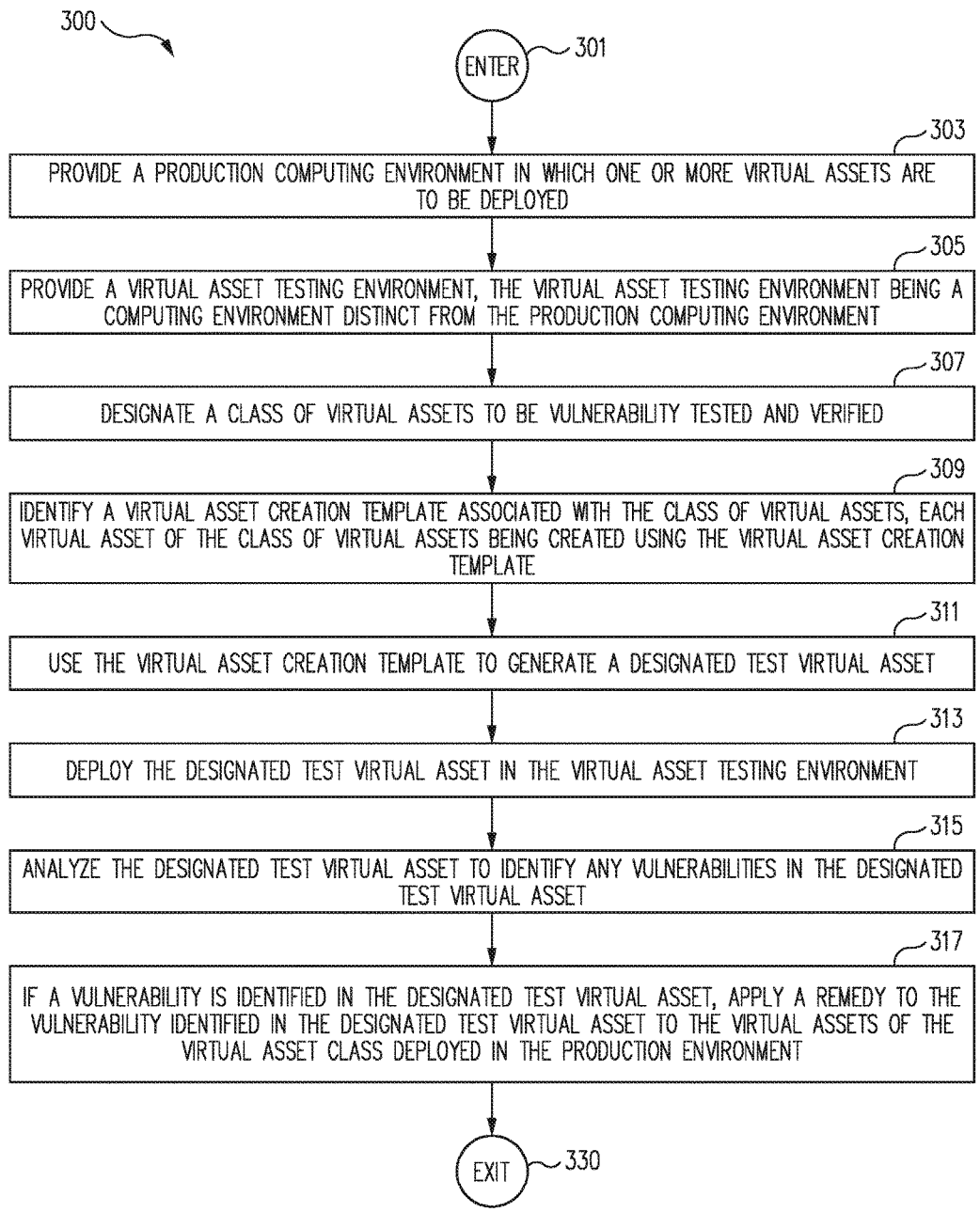
FIG. 3 is a flow chart depicting a process for providing a robust and efficient virtual asset vulnerability management and verification service in accordance with one embodiment.

FIG. 3 is a flow chart of a process 300 for providing a robust and efficient virtual asset vulnerability management and verification service.

In one embodiment, process 300 for providing a robust and efficient virtual asset vulnerability management and verification service begins at ENTER OPERATION 301 of FIG. 3 and process flow proceeds to PROVIDE A PRODUCTION COMPUTING ENVIRONMENT IN WHICH ONE OR MORE VIRTUAL ASSETS ARE TO BE DEPLOYED OPERATION 303.

In one embodiment, PROVIDE A PRODUCTION COMPUTING ENVIRONMENT IN WHICH ONE OR MORE VIRTUAL ASSETS ARE TO BE DEPLOYED OPERATION 303; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 305; DESIGNATE A CLASS OF VIRTUAL ASSETS TO BE VULNERABILITY TESTED AND VERIFIED OPERATION 307; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309; USE THE VIRTUAL ASSET CREATION TEMPLATE TO GENERATE A DESIGNATED TEST VIRTUAL ASSET OPERATION 311; DEPLOY THE DESIGNATED TEST VIRTUAL ASSET IN THE VIRTUAL ASSET TESTING ENVIRONMENT OPERATION 313; and ANALYZE THE DESIGNATED TEST VIRTUAL ASSET TO IDENTIFY ANY VULNERABILITIES IN THE DESIGNATED TEST VIRTUAL ASSET OPERATION 315 of process 300 for providing a robust and efficient virtual asset vulnerability management and verification service are substantially identical to PROVIDE A PRODUCTION COMPUTING ENVIRONMENT IN WHICH ONE OR MORE VIRTUAL ASSETS ARE TO BE DEPLOYED OPERATION 203; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205; DESIGNATE A CLASS OF VIRTUAL ASSETS TO BE VULNERABILITY TESTED AND VERIFIED OPERATION 207; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209; USE THE VIRTUAL ASSET CREATION TEMPLATE TO GENERATE A DESIGNATED TEST VIRTUAL ASSET OPERATION 211; DEPLOY THE DESIGNATED TEST VIRTUAL ASSET IN THE VIRTUAL ASSET TESTING ENVIRONMENT OPERATION 213; and ANALYZE THE DESIGNATED TEST VIRTUAL ASSET TO IDENTIFY ANY VULNERABILITIES IN THE DESIGNATED TEST VIRTUAL ASSET OPERATION 215 of process 200 for providing a robust and efficient virtual asset vulnerability management and verification service.

Consequently the reader is referred to the discussion above for a more detailed description of PROVIDE A PRODUCTION COMPUTING ENVIRONMENT IN WHICH ONE OR MORE VIRTUAL ASSETS ARE TO BE DEPLOYED OPERATION 303; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 305; DESIGNATE A CLASS OF VIRTUAL ASSETS TO BE VULNERABILITY TESTED AND VERIFIED OPERATION 307; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309; USE THE VIRTUAL ASSET CREATION TEMPLATE TO GENERATE A DESIGNATED TEST VIRTUAL ASSET OPERATION 311; DEPLOY THE DESIGNATED TEST VIRTUAL ASSET IN THE VIRTUAL ASSET TESTING ENVIRONMENT OPERATION 313; and ANALYZE THE DESIGNATED TEST VIRTUAL ASSET TO IDENTIFY ANY VULNERABILITIES IN THE DESIGNATED TEST VIRTUAL ASSET OPERATION 315.

In one embodiment, once the designated test virtual asset of USE THE VIRTUAL ASSET CREATION TEMPLATE TO GENERATE A DESIGNATED TEST VIRTUAL ASSET OPERATION 311 is subjected to vulnerability analysis and verification in the testing computing environment at ANALYZE THE DESIGNATED TEST VIRTUAL ASSET TO IDENTIFY ANY VULNERABILITIES IN THE DESIGNATED TEST VIRTUAL ASSET OPERATION 315, if no vulnerabilities are identified in the designated test virtual asset in the testing computing environment, each virtual asset of the virtual asset class generated using the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 is assumed to be free of the vulnerabilities tested for in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 and process flow proceeds to EXIT OPERATION 330.

In one embodiment, if one or more vulnerabilities are identified in the designated test virtual asset, process flow proceeds to IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317.

In one embodiment, at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317 an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 is identified and applied to each of the virtual assets created by the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 and deployed in the production computing environment of PROVIDE A PRODUCTION COMPUTING ENVIRONMENT IN WHICH ONE OR MORE VIRTUAL ASSETS ARE TO BE DEPLOYED OPERATION 303.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 is identified and applied to each of the virtual assets created by the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 and deployed in the production computing environment of PROVIDE A PRODUCTION COMPUTING ENVIRONMENT IN WHICH ONE OR MORE VIRTUAL ASSETS ARE TO BE DEPLOYED OPERATION 303 at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317, process flow proceeds to EXIT OPERATION 330.

In one embodiment, at EXIT OPERATION 330 process for providing a robust and efficient virtual asset vulnerability management and verification service is exited to await new data.

Using process 300 for providing a robust and efficient virtual asset vulnerability management and verification service, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using process 300 for providing a robust and efficient virtual asset vulnerability management and verification service, vulnerability testing or verification can be performed on the designated test virtual asset in the test computing environment associated with a type of connectivity, or operational scenario, other than the specific type of connectivity allowed for the virtual asset in the production computing environment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing a robust and efficient virtual asset vulnerability management and verification service comprising:
    at least one processor; and
    at least one memory unit coupled to the at least one processor, the at least one memory unit having stored therein instructions which when executed by any set of the one or more processors, perform a process for providing a robust and efficient virtual asset vulnerability management and verification service, the process for providing a robust and efficient virtual asset vulnerability management and verification service including:
    providing a production computing environment in which one or more virtual assets are to be deployed;

providing a virtual asset testing environment, the virtual asset testing environment being a computing environment distinct from the production computing environment;

designating a class of virtual assets to be vulnerability tested and verified;

identifying a virtual asset creation template associated with the class of virtual assets, each virtual asset of the class of virtual assets being created using the virtual asset creation template;

generating, using the virtual asset creation template, a designated test virtual asset;

deploying the designated test virtual asset in the virtual asset testing environment;

analyzing the designated test virtual asset to identify one or more vulnerabilities in the designated test virtual asset;

for at least one vulnerability identified in the designated test virtual asset, applying a remedy directly to the virtual asset creation template to transform the virtual asset creation template to a verified virtual asset creation template; and using the verified virtual asset creation template to create a plurality of virtual assets of the virtual asset class to be deployed in the production environment.

2. The system for providing a robust and efficient virtual asset vulnerability management and verification service of claim 1 wherein the virtual asset creation template is selected from the group of virtual asset creation templates consisting of:

a tool and/or system for creating and managing a collection of related cloud resources;

a configuration management tool associated with the class of virtual assets;

a virtual appliance used to instantiate each virtual asset of the class of virtual assets; and any set of steps, instructions, and/or operations used to create each virtual asset of the class of virtual assets.

3. The system for providing a robust and efficient virtual asset vulnerability management and verification service of claim 1 wherein the virtual asset class is a virtual asset class selected from the group of the virtual asset classes consisting of:

a virtual machine class;
a virtual server class;
a virtual database or data store class;
a specific type of instance instantiated in a cloud environment;
an application development process class; and
an application class.

4. The system for providing a robust and efficient virtual asset vulnerability management and verification service of claim 1 wherein each virtual asset of the class of virtual assets created using the virtual asset creation template has the same defined initial operational parameters selected from the group of operational parameters consisting of:

the function of the virtual assets of the virtual asset class;
the storage capability allocated to the virtual assets of the virtual asset class;
the processing capability allocated to the virtual assets of the virtual asset class;
the hardware allocated to the virtual assets of the virtual asset class;
the software allocated to virtual assets of the virtual asset class; and
any combination thereof.

5. The system for providing a robust and efficient virtual asset vulnerability management and verification service of claim 1 wherein virtual assets of the class of virtual assets created using the virtual asset creation template are deployed in the production computing environment with one or more connectivity restrictions being imposed on the virtual assets.

6. The system for providing a robust and efficient virtual asset vulnerability management and verification service of claim 5 wherein the designated test virtual asset of the class of virtual assets created using the virtual asset creation template is deployed in the test environment without at least one of the one or more the connectivity restrictions imposed on the virtual assets deployed in the production environment.

7. A system for providing a robust and efficient virtual asset vulnerability management and verification service comprising:

a production computing environment in which one or more virtual assets are to be deployed;

a virtual asset testing environment, the virtual asset testing environment being a computing environment distinct from the production computing environment;

a class of virtual assets to be vulnerability tested and verified;

a virtual asset creation template associated with the class of virtual assets, each virtual asset of the class of virtual assets being created using the virtual asset creation template;

at least one processor; and at least one memory unit coupled to the at least one processor, the at least one memory unit having stored therein instructions which when executed by any set of the one or more processors, perform a process for providing a robust and efficient virtual asset vulnerability management and verification service, the process for providing a robust and efficient virtual asset vulnerability management and verification service including:

generating, using the virtual asset creation template, a designated test virtual asset;

deploying the designated test virtual asset in the virtual asset testing environment;

analyzing the designated test virtual asset to identify one or more vulnerabilities in the designated test virtual asset;

for at least one vulnerability identified in the designated test virtual asset, applying a remedy directly to the virtual asset creation template to transform the virtual asset creation template to a verified virtual asset creation template; and using the verified virtual asset creation template to create a plurality of virtual assets of the virtual asset class to be deployed in the production environment.

8. The system for providing a robust and efficient virtual asset vulnerability management and verification service of claim 7 wherein the virtual asset creation template is selected from the group of virtual asset creation templates consisting of:

a tool and/or system for creating and managing a collection of related cloud resources;

a configuration management tool associated with the class of virtual assets;

a virtual appliance used to instantiate each virtual asset of the class of virtual assets; and any set of steps, instructions, and/or operations used to create each virtual asset of the class of virtual assets.

9. The system for providing a robust and efficient virtual asset vulnerability management and verification service of claim 7 wherein the virtual asset class is a virtual asset class selected from the group of the virtual asset classes consisting of:

a virtual machine class;
a virtual server class;
a virtual database or data store class;
a specific type of instance instantiated in a cloud environment;
an application development process class; and
an application class.

10. The system for providing a robust and efficient virtual asset vulnerability management and verification service of claim 7 wherein each virtual asset of the class of virtual assets created using the virtual asset creation template has the same defined initial operational parameters selected from the group of operational parameters consisting of:

the function of the virtual assets of the virtual asset class;
the storage capability allocated to the virtual assets of the virtual asset class;
the processing capability allocated to the virtual assets of the virtual asset class;
the hardware allocated to the virtual assets of the virtual asset class;
the software allocated to virtual assets of the virtual asset class; and
any combination thereof.

11. The system for providing a robust and efficient virtual asset vulnerability management and verification service of claim 7 wherein virtual assets of the class of virtual assets created using the virtual asset creation template are deployed in the production computing environment with one or more connectivity restrictions being imposed on the virtual assets.

12. The system for providing a robust and efficient virtual asset vulnerability management and verification service of claim 11 wherein the designated test virtual asset of the class of virtual assets created using the virtual asset creation template is deployed in the test environment without at least one of the one or more the connectivity restrictions imposed on the virtual assets deployed in the production environment.

* * * * *